(12) United States Patent
Yang et al.

(10) Patent No.: US 11,184,046 B2
(45) Date of Patent: Nov. 23, 2021

(54) WATERPROOF CONNECTING STRUCTURE AND ANTENNA SYSTEM WITH THE SAME

(71) Applicant: SHENZHEN ANTOP TECHNOLOGY LIMITED, Guangdong (CN)

(72) Inventors: Ruidian Yang, Guangdong (CN); Gaofeng Ni, Guangdong (CN)

(73) Assignee: SHENZHEN ANTOP TECHNOLOGY LIMITED, Shenzhen (CN)

( * ) Notice: Subject to any disclaimer, the term of this patent is extended or adjusted under 35 U.S.C. 154(b) by 411 days.

(21) Appl. No.: 16/237,331

(22) Filed: Dec. 31, 2018

(65) Prior Publication Data

US 2019/0334567 A1    Oct. 31, 2019

(30) Foreign Application Priority Data

Apr. 25, 2018   (CN) .......................... 201820601581.8

(51) Int. Cl.
| | |
|---|---|
| *H02G 3/08* | (2006.01) |
| *H04B 1/38* | (2015.01) |
| *H01Q 1/50* | (2006.01) |
| *H01Q 1/42* | (2006.01) |
| *H01Q 1/38* | (2006.01) |
| *H01Q 1/40* | (2006.01) |

(52) U.S. Cl.
CPC ................. *H04B 1/38* (2013.01); *H01Q 1/38* (2013.01); *H01Q 1/40* (2013.01); *H01Q 1/42* (2013.01); *H01Q 1/50* (2013.01); *H04B 2001/3894* (2013.01)

(58) Field of Classification Search
CPC .......... H02G 3/08; H02G 3/081; H02G 3/086; H02G 3/088; H02G 3/14; H05K 5/00; H05K 5/02; H05K 5/0204; H05K 5/0217; H05K 5/0221; H05K 5/0247; H05K 5/04; H01R 13/46; H01R 13/52; H01R 13/53; H04B 1/38; H04B 2001/3894
USPC ... 174/50, 520, 17 R, 17 VA, 535, 539, 559, 174/560, 561, 564; 439/535, 536, 538; 248/906
See application file for complete search history.

(56) References Cited

U.S. PATENT DOCUMENTS

| | | | | |
|---|---|---|---|---|
| 4,542,437 | A | * | 9/1985 | Ellis .......................... H02G 9/10 174/38 |
| 5,798,910 | A | * | 8/1998 | Holbeche ............... H05K 5/063 174/559 |

(Continued)

*Primary Examiner* — Angel R Estrada
(74) *Attorney, Agent, or Firm* — Muncy, Geissler, Olds & Lowe, P.C.

(57) ABSTRACT

The present invention discloses a waterproof connecting structure including an upper portion and a lower portion, wherein the lower portion includes a hollow cylindrical first body, the upper portion includes a hollow cylindrical second body, and the second body is engaged and sleeved with the first body. The second body is provided with clamping slots, the first body is provided with protruding parts for being rotationally clamping with the clamping slots, or the first body is provided with clamping slots, and the second body is provided with protruding parts for being rotationally clamping with the clamping slots. Through such arrangement, rainwater can be effectively prevented from flowing into the base and the external antenna from the connection portion.

13 Claims, 8 Drawing Sheets

(56) References Cited

U.S. PATENT DOCUMENTS

| | | | | |
|---|---|---|---|---|
| 6,727,429 B1 * | 4/2004 | Koessler | .............. | H02G 3/088 |
| | | | | 174/50 |
| 6,831,222 B2 * | 12/2004 | Pastuch | .............. | H02G 15/043 |
| | | | | 174/58 |
| 6,881,899 B1 * | 4/2005 | Trangsrud | .............. | H02G 9/10 |
| | | | | 174/50 |
| 8,420,937 B2 * | 4/2013 | Hsu | .............. | H05K 5/063 |
| | | | | 174/91 |

* cited by examiner

WATERPROOF CONNECTING STRUCTURE AND ANTENNA SYSTEM WITH THE SAME

TECHNICAL FIELD

The present invention relates to the field of telecommunications, and more particularly, to a waterproof connecting structure and an antenna system with the waterproof connecting structure.

BACKGROUND ART

Wireless signal coverage of a common wireless communication device is limited. When it is used as a networking in mode of Wireless Distribution System (WDS), unsmooth transmission of signals, in particular such as web browsing hysteresis, unstable data transmission, can easily occur during use, as the distance between wireless communication devices is far away. If a better transmission effect is desired during a distant transmission, an effective approach is to add an outdoor antenna to increase coverage of the wireless communication devices. However, in practical operation, when the wireless communication devices are wirelessly bridged, the added antenna should be a directional antenna to enable one-to-one connection of wireless communication devices; when the wireless communication devices are connected in wireless relay mode, the added antenna should be an omni-directional antenna to facilitate one-to-many connection thereof, and when the wireless communication devices are not used as a networking in mode of WDS, the added antenna may be also used alone. Nevertheless, existing antenna devices have difficulty in achieving the above-mentioned functions.

CN 207069044 U discloses an antenna holder and a system with the same, including a base, a wireless communication device and an upper bottom cover, the upper bottom cover being mounted over the base, forming a first cavity between the base and the upper bottom cover, the wireless communication device being placed in the first cavity to electrically connect with an external antenna, and an upper end portion of the upper bottom cover being provided with a hollow boss for mounting the external antenna. The system with the antenna holder includes an external antenna and an external antenna housing, the external antenna being installed in the external antenna housing, and a lower end of the external antenna being provided with an upper portion which matches the hollow boss. However, such system exists some defects that the upper portion is snapped onto the base by a barb portion, such arrangement may cause lower durability due to easy wear of the snap position; in addition, the whole device is in poor waterproof and fixed performance so that rainwater can easily flow into a bottom surface of the external antenna, and then flow into the base through a gap between the external antenna and the upper portion, thereby affecting the communication transmission performance of the device.

SUMMARY OF THE INVENTION

It's therefore an object of the present invention to provide a connecting structure which is easy to replace and has good waterproof performance at a connection portion and an antenna system with the connecting structure.

A waterproof connecting structure according to the present invention includes an upper portion and a lower portion, wherein the lower portion includes a first hollow cylindrical body and the upper portion includes a second hollow cylindrical body, the second body being engaged and sheathed with the first body. The second body is provided with a clamping slot, the first body is provided with a protruding part for being rotationally clamping with the clamping slot. Alternatively, the first body is provided with a clamping slot, and the second body is provided with a protruding part for being rotationally clamping with the clamping slot.

According to the present invention, the second body is engaged and sheathed with the first body so that rainwater can be prevented from flowing into the first body and a structure connected with the first body from the connection portion to cause damage to circuits inside. Moreover, the second body being connected to the first body by rotational clamp connection, so that the user can remove the second body only rotating the second body, which facilitates maintenance of internal circuit lines of the structure connected with the first body. Further, compared with a snap-fit connection and a fastening connection or the like, the rotational clamp connection is not easy to wear and has better durability. Since both the second body and the first body are hollow structures, the cable may pass through the interior of the second body and the first body, thereby facilitating connecting together of internal circuit signals of the two structures connected with the second body and the first body.

Preferably, a locking structure is further provided between the first body and the second body for preventing relative rotation of the first body and the second body. The locking structure may be a button structure.

The locking structure is arranged to control relative rotation between the second body and the first body, so that the second body is limited to rotate when the second body is clamped, avoiding that the second body will fall off due to free rotation, thus improving safety and stability of the overall system.

More preferably, the locking structure is a bolt structure. Correspondingly, the second body 2 and the first body 1 are provided with bolt holes, so that the first body will be fixed with the second body by bolts when the first body is rotationally clamped with the second body.

According to the present invention, the first body is fixed with the second body by a bolt structure so that people can rotate the second body and the first body by only unscrewing the bolts. Therefore, it ensures stability of the locking structure and easy operation for the use.

Preferably, the first body is provided with more than one protruding part and each protruding part matches the clamping slot in different way. The protruding parts are preferably symmetrical with respect to the axis of the first body.

Arranging more than one protruding part is to make stress asymmetrical and to reduce the pressure on the protruding parts, and since the protruding parts cannot cooperate with other non-corresponding clamping slots, users can have only one correct assembly method when assembling the antenna system, thereby avoiding assembly errors as much as possible. The assembly error causes mismatch between the bolt holes of the first body and the second body, so that the bolts cannot be successfully mounted, the first body and the second body can continue to rotate with each other, reducing the safety and stability of the entire system.

Preferably, an upper end portion of the second body is provided with a convex edge, and the convex edge is provided with flow guiding ports which communicate with the outside.

Arranging the flow guiding ports is to drain rainwater flowing to the second body to the outside of the antenna system, thereby preventing the rainwater from entering the interior of the structure connected with the first body.

Therefore, the flow guiding ports are preferably disposed around the convex edge and surrounding the hollow part of the second body, thus increasing the waterproof performance of the waterproof connecting structure.

Preferably, a notch is arranged inside of a top surface of the second body such that there is a gap between the top surfaces of both the first body and the second body when they are rotationally clamped.

The notch being arranged inside of the top surface of the second body, the rainwater flows through the top end of the second body to the gap between the first body and the second body, so that another protection will form for preventing rainwater from flowing into the structure connected with the first body, which further improves the waterproof performance of the waterproof connecting structure.

An antenna system including the above-mentioned waterproof connecting structure is also provided according to the present invention, comprising a base, a first body, a second body, and an external antenna, wherein the first body is disposed on the base, and the second body is connected to the external antenna by a bolt structure. Preferably, the first body is integrally formed with the base.

The cable of the external antenna penetrates into the base from the middle of the first body and the second body. The external antenna is provided with a channel connected to the hollow part of the second body, the base is also provided with a channel connected to a hollow part of the first body, so that the cable of the external antenna can pass through the channel of the first body, the second body and the base to reach the base via the channel of the external antenna.

Preferably, the upper end portion of the second body is provided with a convex edge, and the external antenna is provided with a groove matching the convex edge.

Through the cooperation of the groove and the convex edge, the external antenna can be stably placed on the second body, rainwater will be difficult to enter the base and the external antenna through the gap between the groove and the convex edge, and; and thirdly, the contact area of the second body with the external antenna can be increased by the arrangement of the convex edge, so that the external antenna can be placed on the second body more stably.

Preferably, the outside of the groove is provided with a protrusion engaged and surrounding with the outside of convex edge when the external antenna is fixed with the second body.

As rainwater can easily enter the base and the external antenna through the gap between the groove and the convex edge, the present invention lengthens the distance from the entrance of the gap to the top surface of the convex edge by arranging a protrusion on the groove, so that rainwater needs to flow a longer distance to enter the base, and the waterproof performance of the entire system is thus further improved.

The convex edge is preferably a round convex edge and the groove is a round groove; alternatively, the convex edge is a square convex edge, and the groove is a square groove.

When the convex edge and the groove are in a round form, the convex edge is provided with a bayonet, and the external antenna is provided with a clamp part which matches the bayonet, alternatively, the external antenna is provided with a bayonet, and the convex edge is provided with a clamp part matching the bayonet. Preferably, the bayonet is provided on the top surface of the convex edge, and the clamp part is disposed on a bottom surface of the external antenna.

When the convex edge and the groove are in round forms and the second body and the external antenna are not equipped with bolts, the second body and the external antenna can rotate with each other, which is disadvantageous for people to align the bolt holes on the second body and the external antenna to mount the bolts. Therefore, the bayonet and clamp part are arranged according to the present invention so as to ensure that when the bolts are being mounted, the second body and the external antenna do not rotate with respect to each other, which is convenient for people to mount the bolts.

The base is provided with a wireless communication device and a built-in antenna which matches with the wireless communication device, or the external antenna is provided with a wireless communication device and the base is provided with a built-in antenna which matches with the wireless communication device.

The cable of the wireless communication device may pass through the channel of the base, the first body, the second body, and the channel of the external antenna and enter the external antenna, so as to connect with the external antenna by signal. The wireless communication device may also be connected with the external antenna by wireless signals.

The base is provided with a support base. A cavity is formed between the base and the support base.

The present invention can obtain some desirable technical effects. The waterproof connecting structure according to the present is arranged at the connection portion of the base and the external antenna, so that rainwater can be prevented from flowing into the base and the external antenna from the connection portion. In addition, the first body is connected to the second body by rotational clamping connection, which is convenient for people to repair and replace the antenna and has better durability due to avoiding the snap-fit connection. Further, the cable may pass through the interior of the second body and the first body to facilitate connecting the communication device in the base to the external antenna by signal.

DESCRIPTION OF EMBODIMENTS

The present invention will be further illustrated below in conjunction with specific embodiments. It should be understood that these embodiments are only used to illustrate the present invention and are not intended to limit the scope of the present invention. Also, it should be understood that those skilled in the art may make various modifications and changes after reading the contents in the present invention, and these equivalent forms also intended to fall within the scope of the appended claims of the present application.

Embodiment 1

Figure 1:
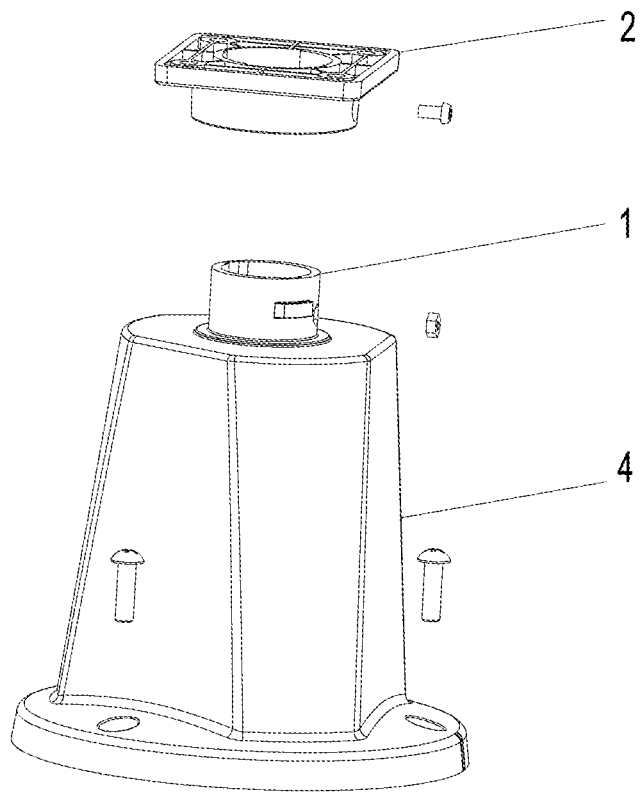
FIG. 1 is a schematic structural exploded view of a first embodiment.
Figure 2:
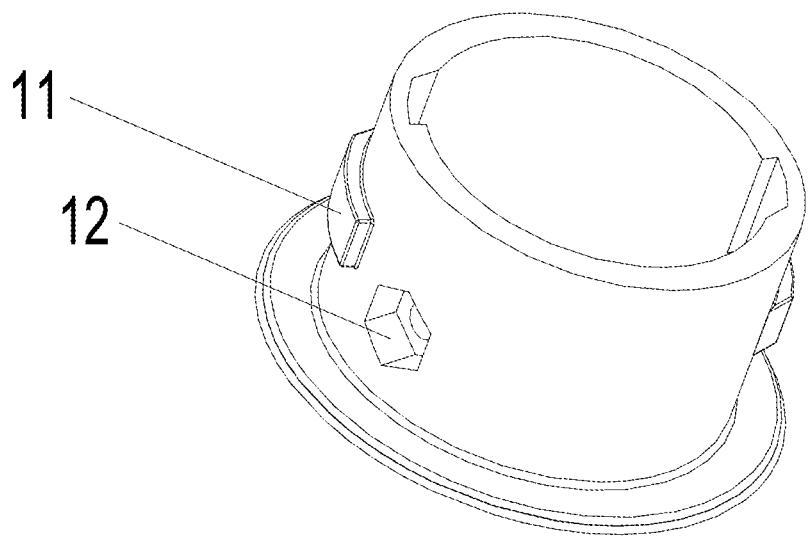
FIG. 2 is a schematic structural view of a first body.

As shown in FIG. 1, a waterproof connecting structure according to the present embodiment includes an upper portion and a lower portion, wherein the lower portion includes a first hollow cylindrical body 1, the upper portion includes a second hollow cylindrical body 2, and the second body 2 is engaged and sheathed with the first body 1. The first body 1 can be disposed on a base and integrally formed with the base.

In combination with FIGS. 2 to 9, the second body 2 is provided with a clamping slot 21, and the first body 1 is provided with a protruding part 11 for being rotationally clamping with the clamping slot 21. Preferably, the clamping slot 21 is arranged on an inner surface of the second body 2 clamping slot, and the protruding part 11 is arranged on an outer surface of the first body 1.

The second body is configured to be engaged and sheathed with the first body so that rainwater can be prevented from flowing into the first body and a structure connected with the first body from the connection portion to cause damage to circuits inside. The second body is further configured to be connected to the first body by rotational clamping connection, allowing people to remove the second body only rotating the second body, which facilitates maintenance of internal circuit lines of the structure connected with the first body. Moreover, compared with a snap-fit connection and a fastening connection or the like, the rotational clamping connection is not easy to wear and has better durability. In addition, the design of hollow structures of the second body and the first body can make the cable pass through the interior of the second body and the first body, facilitating connecting together of internal circuits of the structure connected with the second body and the first body.

Alternatively, the first body 1 is provided with a clamping slot, and the second body 2 is provided with a protruding part for being rotationally snapped onto the clamping slot.

Preferably, a locking structure is further arranged between the first body 1 and the second body 2 for preventing relative rotation of the first body 1 and the second body 2. The locking structure may preferably be a button structure.

In this embodiment, the locking structure is a bolt structure. Correspondingly, the second body 2 and the first body 1 are provided with bolt holes, so that the first body 1 will be further fixed with the second body 2 by bolts when the first body 1 is rotationally snapped onto the second body 2.

The bolt structure is arranged to fix the second body and the first body, so that the second body and the first body can be rotated with the bolt unscrewed, which ensures the stability of the locking structure and easy operation for the use.

Preferably, the first body 1 is provided with two protruding parts 11. Each protruding part 11 can matches the clamping slot 21 in different way. The protruding parts 11 are preferably symmetrical with respect to the axis of the first body 1.

Arranging two protruding parts is to make stress asymmetrical and to reduce the pressure on the protruding parts, and since the protruding parts cannot cooperate with other non-corresponding clamping slots, users can have only one correct assembly method when assembling the antenna system, thereby avoiding assembly errors as much as possible, which causes mismatch between the bolt holes of the first body and the second body to make the bolts cannot be successfully mounted and to make the first body and the second body continue to rotate with each other, reducing the safety and stability of the entire system.

Figure 3:
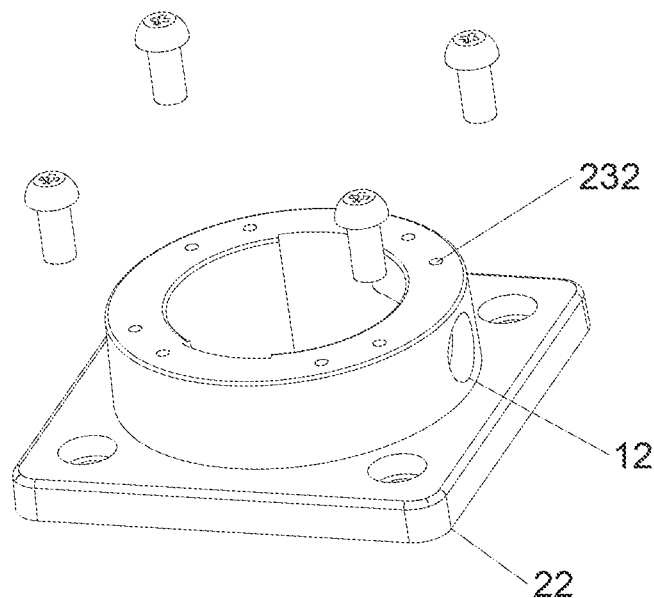
FIG. 3 is a schematic structural view of a second body with a square convex edge.
Figure 4:
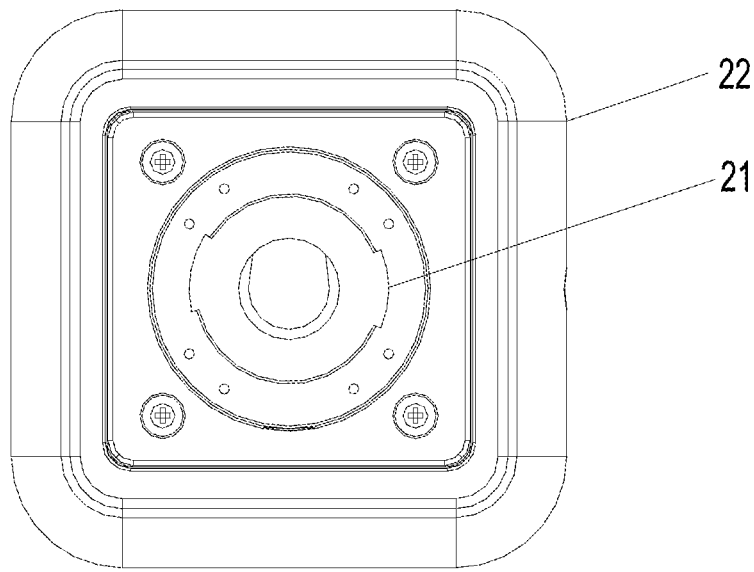
FIG. 4 is a bottom view of FIG. 3.
Figure 5:
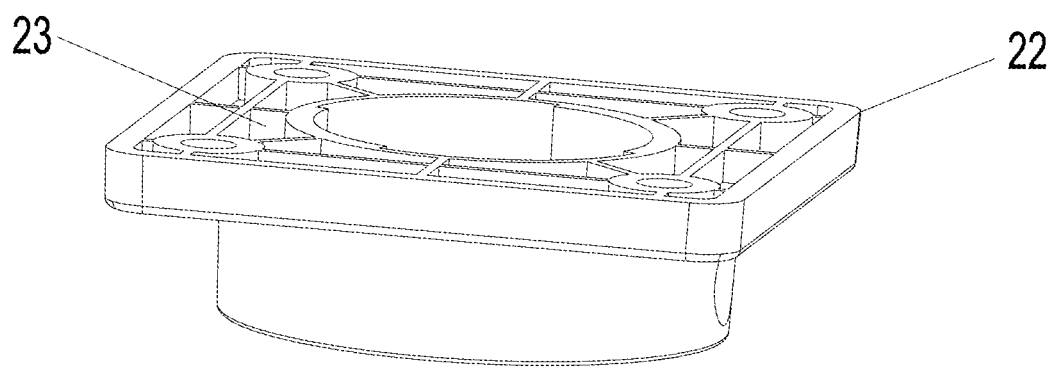
FIG. 5 is another schematic structural view of a second body with a square convex edge.
Figure 6:
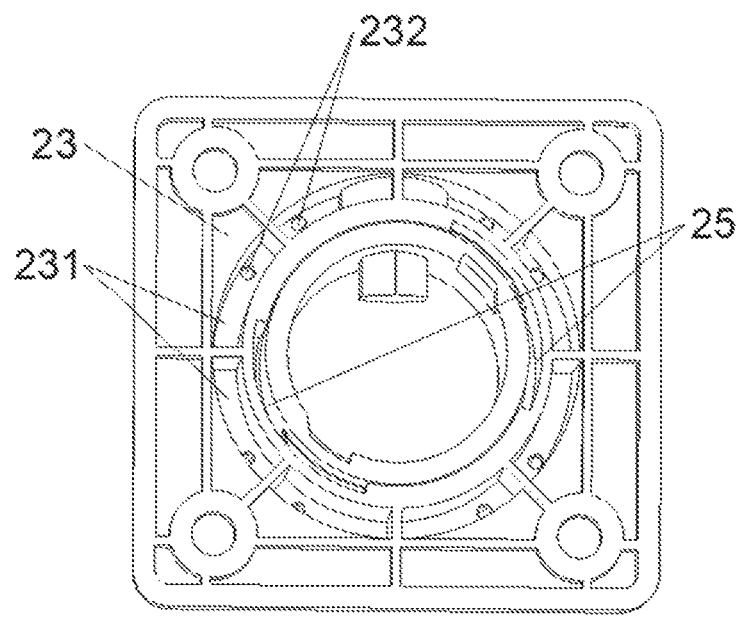
FIG. 6 is a schematic structural view of the assembly of a first body and a second body.
Figure 7:
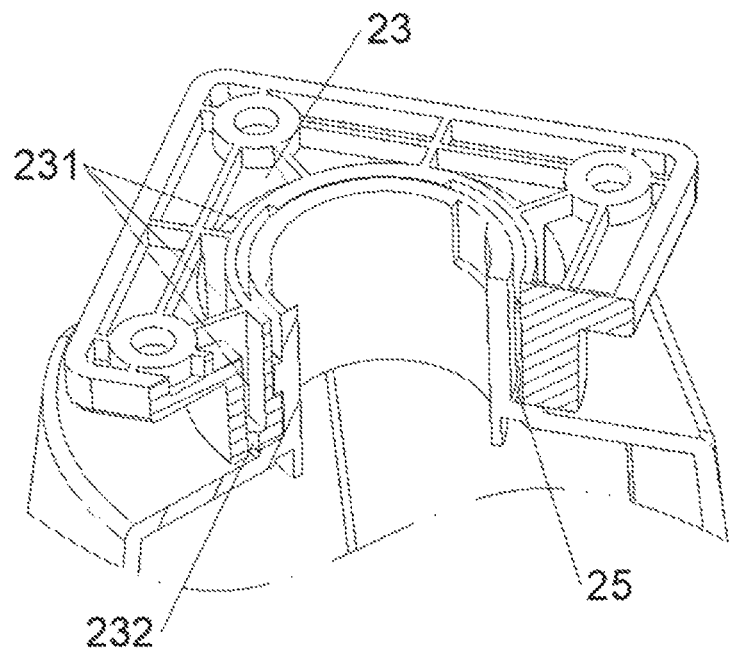
FIG. 7 is a partial sectional view of the assembly of a first body and a second body.
Figure 8:
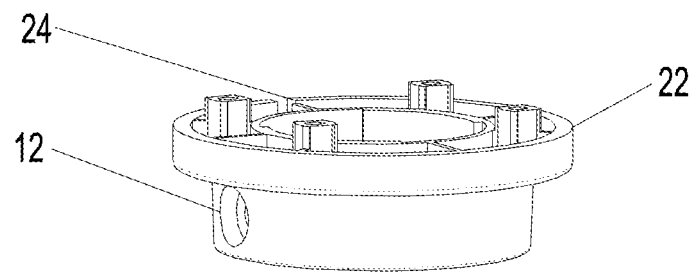
FIG. 8 is a schematic structural view of a second body with a round convex edge.
Figure 9:
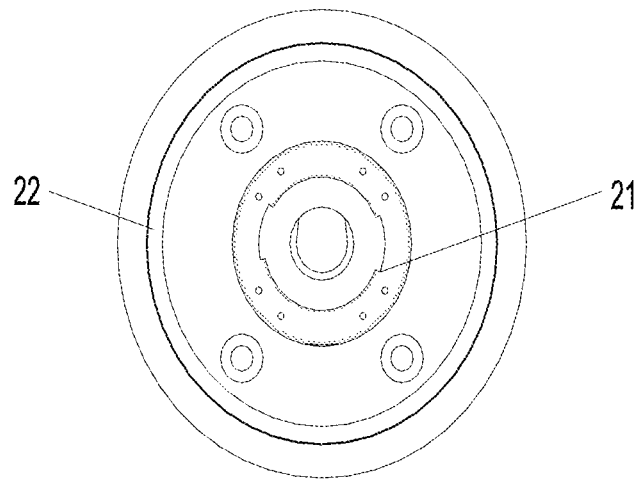
FIG. 9 is a bottom view of FIG. 8.

As shown in FIG. 5, an upper end portion of the second body 2 is provided with a convex edge 22, and the convex edge 22 is provided with flow guiding ports 23 which communicate with the outside. As shown in FIGS. 6 and 7, the flow guiding ports 23 are configured as four water flow grooves 231 arranged around the convex edge 22, and each water groove 231 is provided with two flow guiding holes 232. Such arrangement can drain rainwater flowing to the second body to the outside of the antenna system, thereby preventing the rainwater from entering the interior of the structure connected with the first body. Thus, the flow guiding ports 23 are preferably disposed around the convex edge and surrounding the hollow part of the second body, increasing the waterproof performance of the waterproof connecting structure. The convex edge 22 can be square as shown in FIGS. 3-5, and can also be round as shown in FIGS. 8 and 9.

Preferably, as shown in FIGS. 6 and 7, the inside of a top surface of the second body 2 is provided a notch 25, so that there is a gap between the top surfaces of both the first body and the second body when they are rotationally clamped.

The notch 25 being arranged inside of the top surface of the second body, the rainwater will flow through the top end of the second body 2 to the gap between the first body 1 and the second body 2, so that another protection will form for preventing rainwater from flowing into the structure connected with the first body, which further improves the waterproof performance of the waterproof connecting structure.

Embodiment 2

Figure 10:
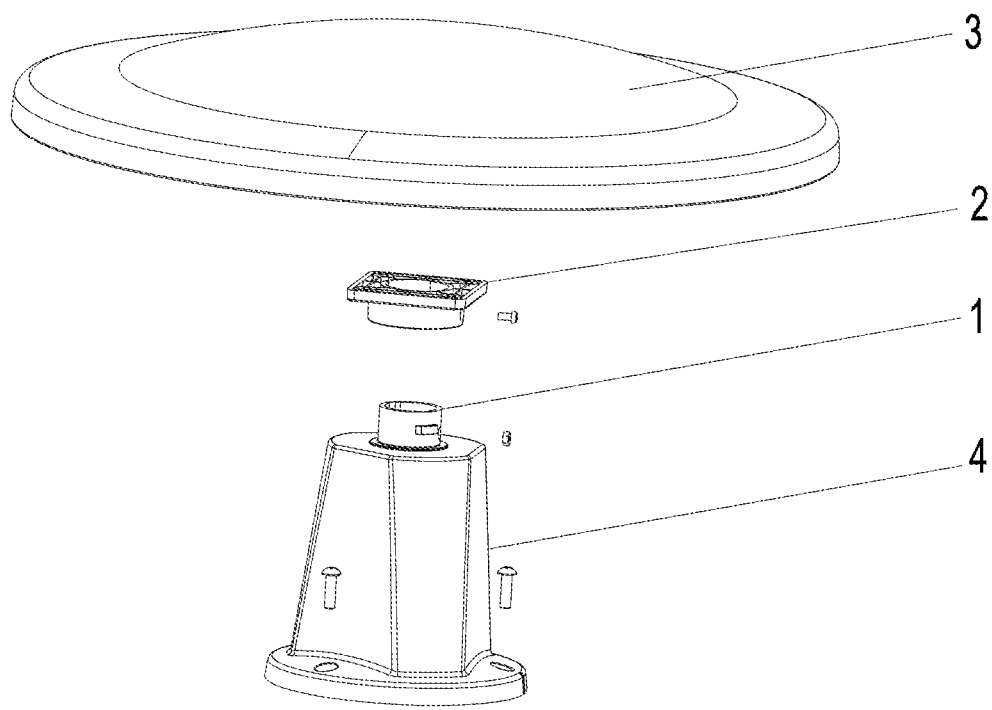
FIG. 10 is a schematic structural exploded view of a second embodiment.
Figure 11:
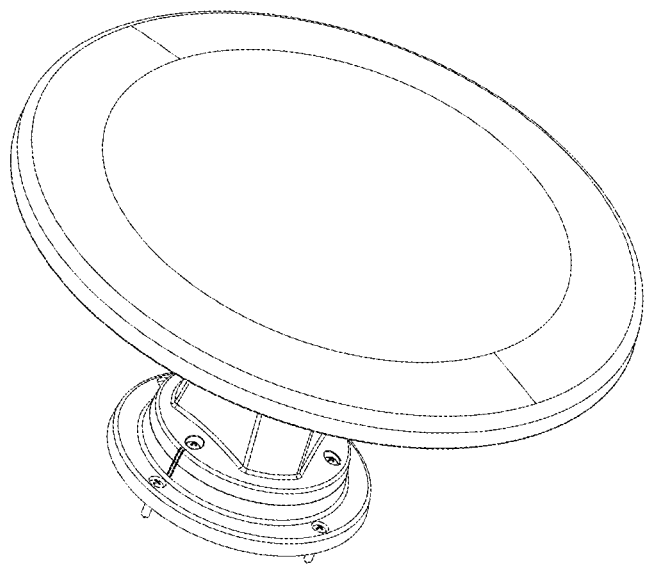
FIG. 11 is a schematic structural view of the second embodiment in combination.

The present embodiment provides an antenna system with the waterproof connecting structure according to embodiment 1 including an upper portion and a lower portion, the lower portion containing a first hollow cylindrical body 1, the upper portion containing a second hollow cylindrical body 2 engaged and sheathed with the first body 1. As shown in FIGS. 10 and 11, the antenna system further includes a base 4 and an external antenna 3. The first body 1 is disposed on the base 4 and preferably integrally formed with the base 4. The second body 2 is connected with the external antenna 3 by a bolt structure.

Preferably, the cable of the external antenna 3 penetrates into the base 4 from the middle of the first body 1 and the second body 2.

The external antenna 3 is provided with a channel connected to the hollow structure of the second body 2, the base 4 is also provided with a channel connected to the hollow structure of the first body 1, so that the cable of the external antenna 3 can pass through the first body 1, the second body 2 and the channel of the base 4 to the base 4 via the channel of the external antenna 3.

Preferably, the upper end portion of the second body 2 is provided with a convex edge 22, and the external antenna 3 is provided with a groove matching the convex edge 22. Through the cooperation of the groove and the convex edge, the external antenna can be stably placed on the second body 2, and rainwater is difficult to enter the base 4 and the external antenna 3 through the gap between the groove and the convex edge 22.

Figure 12:
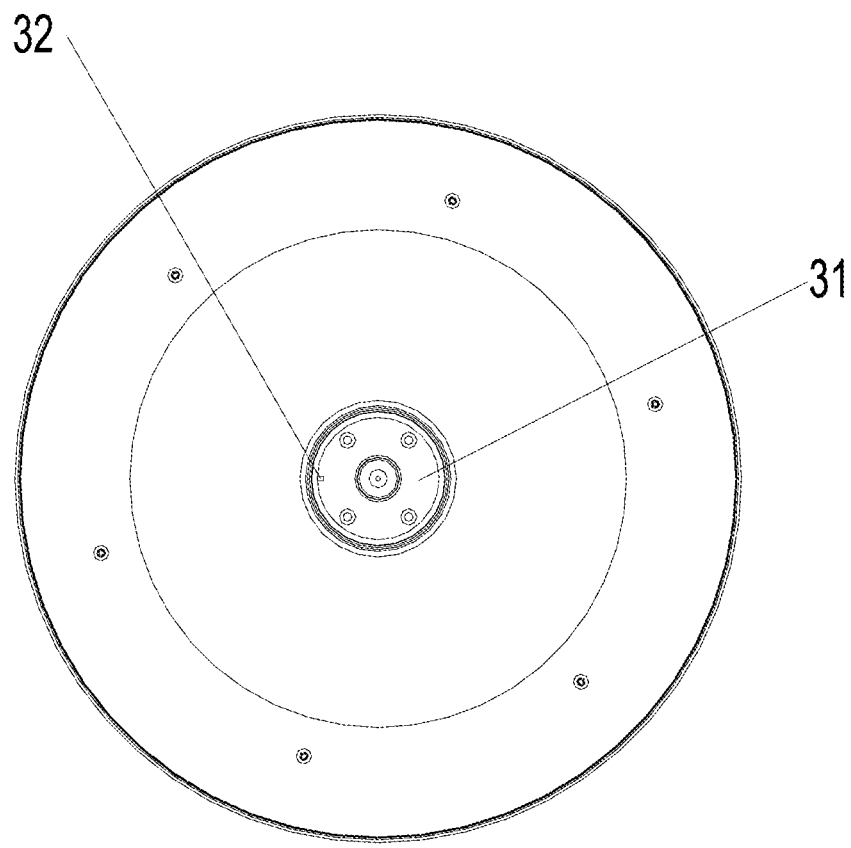
FIG. 12 is a schematic structural view of an external antenna with a square groove.

As illustrated in FIG. 12, the groove 31 can be round, and correspondingly the convex edge 22 is also round.

Figure 13:
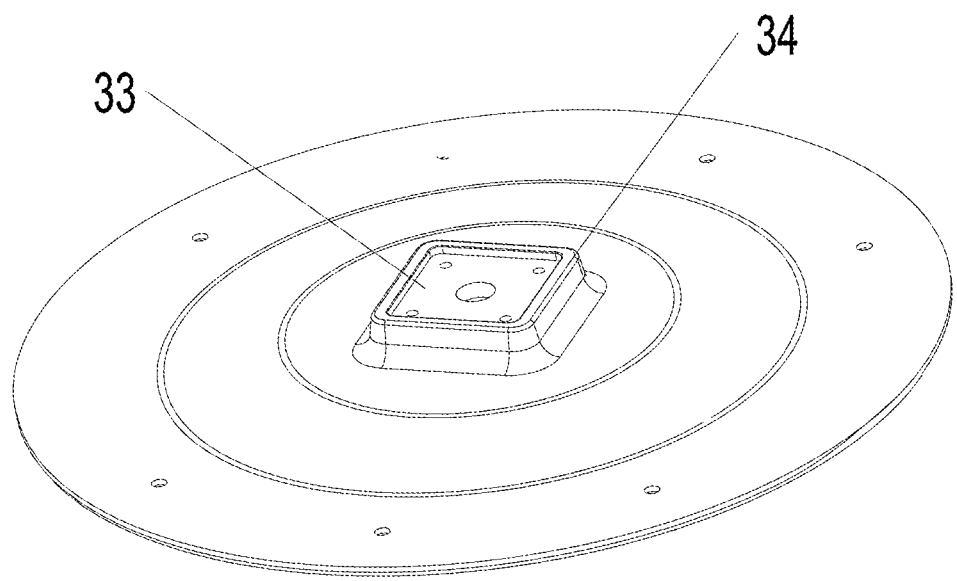
FIG. 13 is a schematic structural view of an external antenna with a round groove.

As illustrated in FIG. 13, the groove 32 can be square, and correspondingly the convex edge 22 is also square.

Preferably, the outside of the groove is provided with a protrusion 34. The protrusion is engaged with and surrounds the outside of the convex edge 22 when the external antenna 3 is fixed with the second body 2. Such arrangement can lengthen the distance from the entrance of the gap between the groove and the convex edge to the top surface of the convex edge, so that rainwater needs to flow a longer distance to enter the base 4, and the waterproof performance of the entire system is thus further improved.

The top surface of the convex edge 22 is further surrounded by bolt holes which are symmetrically arranged. Correspondingly, bolt holes are arranged in the groove, so that bolts can pass through the bolt holes, and the external antenna 3 can be fixed on the second body 2.

As shown in FIG. 8 and FIG. 12, when the groove 31 and the convex edge 22 are ground, the convex edge 22 is provided with a bayonet 24, and the external antenna 3 is provided with a clamp part 32 which can match the bayonet 24. Alternatively, the external antenna 3 can be provided with a bayonet and the convex edge 22 can be provided with a clamp part matching the bayonet 24. The bayonet 24 is preferably arranged on the top surface of the convex edge 22, and the clamp part 32 is preferably arranged on the bottom surface of the external antenna 3.

Figure 14:
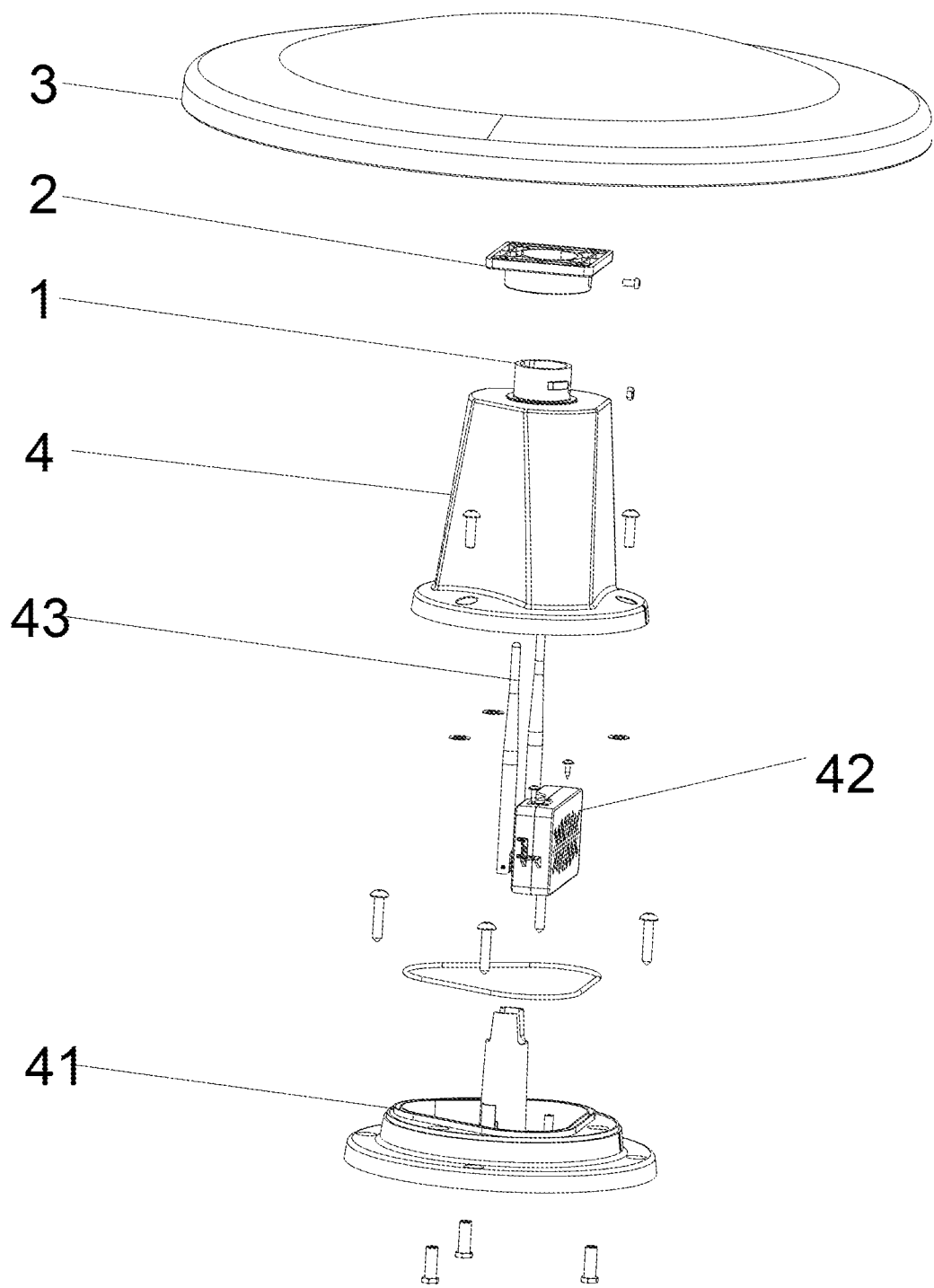
FIG. 14 is another schematic structural exploded view of the second embodiment.

As shown in FIG. 14, a wireless communication device 42 and a built-in antenna 43 matching with the wireless communication device are arranged in the base 4.

The base 4 is provided with a support base 41. A cavity is formed between the base 4 and the support base 41.

Preferably, the support base 41 is provided with a slot and the base 4 is provided with a protruding part for rotationally clamping with the slot. Alternatively, the base is provided with a slot and the first support base is provided with a protruding part for rotationally clamping with the slot.

Preferably, the base 4 is provided a first external port and the support base 41 is provided with a second external port.

Preferably, the support base 41 is provided with bolt holes. Through the bolt holes, the support base 41 can be fixed with the base 4.

Embodiment 3

Figure 15:
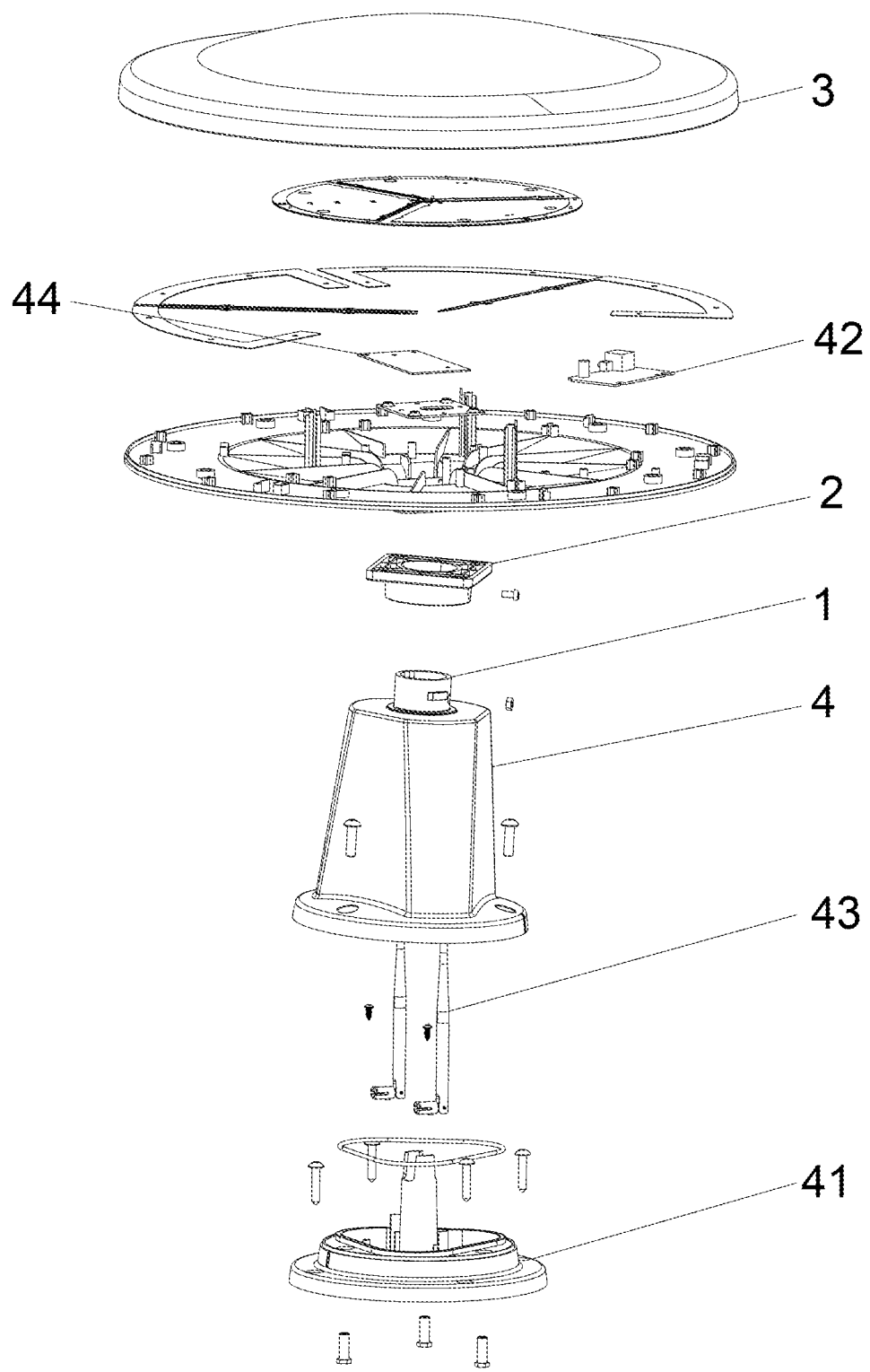
FIG. 15 is a schematic structural exploded view of a third embodiment.

Different from the Embodiment 2, as shown in FIG. 15, the external antenna 3 is provided with a wireless communication device 42. In this embodiment, the wireless communication device 42 is a circuit board structure and is mounted in the external antenna 3. A built-in antenna 43 matching with the wireless communication device 42 is arranged in the base 4. The external antenna 3 contains an external antenna housing and an external antenna body. An antenna signal amplifier 44 is arranged inside the external antenna housing for amplifying signals sent by the external antenna body. The wireless communication device 42 and the built-in antenna 42 may be connected by a cable.

Obviously, the above embodiments of the present invention are merely examples for clear illustration, and are not intended to limit the implementations of the present invention. For those of ordinary skill in the art, modifications or changes can be made on the basis of the above description. There is no need nor exhaustion for all implementations. Any modification, equivalent substitution or improvement, or the like within the spirit and principle of the present invention shall be included in the scope of claims of the present invention.

The invention claimed is:

1. A waterproof connecting structure comprising:
    an upper portion including a hollow cylindrical second body; and
    a lower portion including a hollow cylindrical first body,
    wherein the second body is engaged and sheathed with the first body; the second body is provided with a clamping slot, the first body is provided with a protruding part for being rotationally clamping with the clamping slot, or the first body is provided with a clamping slot, and the second body is provided with a protruding part for being rotationally clamping with the clamping slot;
    wherein an upper end portion of the second body is provided with a convex edge, and the convex edge is provided with flow guiding ports which communicate with the outside.

2. The waterproof connecting structure according to claim 1,
    wherein a locking structure is arranged between the first body and the second body for preventing relative rotation of the first body and the second body.

3. The waterproof connecting structure according to claim 1,
    wherein the first body is provided with more than one protruding part and each protruding part matches the clamping slot in different way.

4. The waterproof connecting structure according to claim 1,
    wherein a notch is arranged inside of a top surface of the second body.

5. An antenna system comprising:
    a waterproof connecting structure according to claim 1,
    a base; and
    an external antenna,
    wherein the first body is disposed on the base, and the second body is connected to the external antenna by a bolt structure.

6. The antenna system according to claim 5,
    wherein a cable of the external antenna penetrates into the base from the middle of the first body and the second body.

7. The antenna system according to claim 5,
    wherein the upper end portion of the second body is provided with a convex edge, and the external antenna is provided with a groove which matches the convex edge.

8. The antenna system according to claim 7,
    wherein the outside of the groove is provided with a protrusion, and the protrusion is engaged with and surrounds the outside of convex edge.

9. The antenna system according to claim 7,
    wherein the convex edge is a round convex edge and the groove is round groove.

10. The antenna system according to claim 7,
    wherein the convex edge is a square convex edge, and the groove is a square groove.

11. The antenna system according to claim 9,
    wherein the convex edge is provided with a bayonet, and the external antenna is provided with a clamp part which mates the bayonet, or the external antenna is provided with a bayonet, and the convex edge is provided with a clamp part which matches the bayonet.

12. The antenna system according to claim 5,
wherein the base is provided with a wireless communication device and a built-in antenna which matches the wireless communication device, or the external antenna is provided with a wireless communication device and the base is provided with a built-in antenna which matches the wireless communication device.

13. The antenna system according to claim 5,
wherein the base is provided with a support base and a cavity is formed between the base and the support base.

\* \* \* \* \*